(12) United States Patent
Cheng et al.

(10) Patent No.: US 6,921,094 B2
(45) Date of Patent: Jul. 26, 2005

(54) WHEEL OF A GOLF CART

(76) Inventors: Pao-Hsien Cheng, No. 139, Jen Yi 1st Street, Jen Te Hsiang, Tainan Hsien (TW); Ying-Hsiung Cheng, No. 139, Jen Yi 1st Street, Jen Te Hsiang, Tainan Hsien (TW); Michel Don Wade, 1408F Camivita Vistana, San Diego, CA (US) 92130

( * ) Notice: Subject to any disclaimer, the term of this patent is extended or adjusted under 35 U.S.C. 154(b) by 169 days.

(21) Appl. No.: 10/642,816

(22) Filed: Aug. 19, 2003

(65) Prior Publication Data

US 2005/0040694 A1 Feb. 24, 2005

(51) Int. Cl.⁷ .................................................. B60B 1/00
(52) U.S. Cl. .............................. 280/47.26; 280/DIG. 6; 301/111.06
(58) Field of Search .................... 280/47.24, 47.17, 280/47.18, 47.21, 47.26, DIG. 6; 301/111.01, 112, 122, 121, 111.03, 111.04, 111.06; 206/315.3

(56) References Cited

U.S. PATENT DOCUMENTS

| | | | | |
|---|---|---|---|---|
| 5,529,385 A | * | 6/1996 | Tsao | 301/111.06 |
| 5,582,421 A | * | 12/1996 | Liu | 280/646 |
| 5,716,107 A | * | 2/1998 | Parker et al. | 301/111.07 |
| 5,997,105 A | * | 12/1999 | Wu | 301/124.1 |
| 6,056,369 A | * | 5/2000 | Lin | 301/111.06 |
| 6,152,540 A | * | 11/2000 | Lin | 301/111.06 |
| 6,186,520 B1 | * | 2/2001 | Barten | 280/30 |
| 6,523,910 B1 | * | 2/2003 | Lin | 301/111.06 |
| 6,641,228 B2 | * | 11/2003 | Liu | 301/111.06 |
| 6,659,477 B2 | * | 12/2003 | Jung | 280/47.26 |
| 6,808,186 B1 | * | 10/2004 | Su | 280/47.26 |
| 6,811,162 B2 | * | 11/2004 | Liao | 280/47.2 |

* cited by examiner

*Primary Examiner*—Christopher P. Ellis
*Assistant Examiner*—Brian Swenson
(74) *Attorney, Agent, or Firm*—Rosenberg, Klein & Lee

(57) ABSTRACT

A wheel of a golf cart includes a connecting member, a rotary main body, and an axle for the rotary main body; the connecting member can be detached from a support part of a main frame of the golf cart for reducing dimension of the cart in packaging and transportation; the connecting member has an engaging element pivoted thereto and biased to an engaging position by means of a torsion spring; the axle can be easily separated from the rotary main body for maintenance and replacement; the axle has an annular engaging recess thereon, and can be inserted in the connecting member to engage the engaging element for connecting the rotary main body to the connecting member; thus, the rotary main body can be easily separated from the main frame of the golf cart together with the axle after the engaging element is pivoted such as to disengage the axle.

7 Claims, 8 Drawing Sheets

WHEEL OF A GOLF CART

BACKGROUND OF THE INVENTION

1. Field of the Invention

The present invention relates to a wheel of a golf cart, more particularly one, which can be easily removed from a main frame of the golf cart for reducing dimension of the golf cart in packaging and transportation, and which has an axle capable of being easily removed for maintenance and replacement.

2. Brief Description of the Prior Art

Referring to FIGS. 8, and 9, a conventional wheel of a golf cart includes a connecting member 11, and a main body 13; the connecting member 11 is secured to a support 10 of a main frame of the golf cart by means of screws, and is equipped with an axle 12, which has an annular recess 121 on a tail end; the wheel main body 13 has a sleeve 14 in the center, and is positioned around the axle 12 at the sleeve 14; a fastening element is fitted around the annular recess 121 of the axle 12 for preventing the main body 13 from falling off, which fastening element can be a C shaped fastener 15, as shown in FIG. 8, or a toothed ring 16, as shown in FIG. 9.

The wheel is found to have disadvantages as followings:
1. The axle 12 can't be removed from the connecting member 11 therefore it will cause increase to the dimension of the golf cart. In other words, the golf cart will occupy more space undesirably in packaging and transportation due to the axle 12.
2. To prevent the axle 12 and the connecting member 11 from causing increase to the dimension of the golf cart in packaging, storage or transportation, tools have to be used on the screws to remove the connecting member 11 from the support 10. And, the tools have to be used again when one wants to make the golf cart ready for use. Therefore, the wheel is not convenient to use.
3. The C shaped fastener 15 and the toothed ring 16 have to be fitted around the annular recess 121 by means of tools therefore it takes much effort to assemble the wheel.
4. C shaped fastener 15 has to be made with precision in size and shape otherwise it can't be well positioned around the annular recess 121, and the wheel main body 13 is prone to separate from the axle 12. Consequently, C shape fastener will cause increase to the manufacturing cost of the wheel. And, the C shape fastener will rust after a certain time period.
5. The toothed ring 16 can't be removed from the axle 12. Consequently, the wheel main body 13 can't be separated from the axle 12, and it is difficult to maintain the wheel.

SUMMARY OF THE INVENTION

It is a main object of the present invention to provide a wheel of a golf cart to overcome the above disadvantages.

The wheel of the present invention includes a connecting member, a rotary main body, and an axle for the rotary main body. The connecting member can be detached from a support part of a main frame of the golf cart for reducing dimension of the cart in packaging and transportation. The connecting member has an engaging element pivoted thereto and biased to an engaging position by means of a torsion spring. The axle can be easily separated from the rotary main body for maintenance and replacement. The axle has an annular engaging recess thereon, and can be inserted in the connecting member to engage the engaging element at the annular recess for connecting the rotary main body to the connecting member; thus, the rotary main body can be easily separated from the main frame of the golf cart together with the axle after the engaging element is disengaged from the annular recess of the axle.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
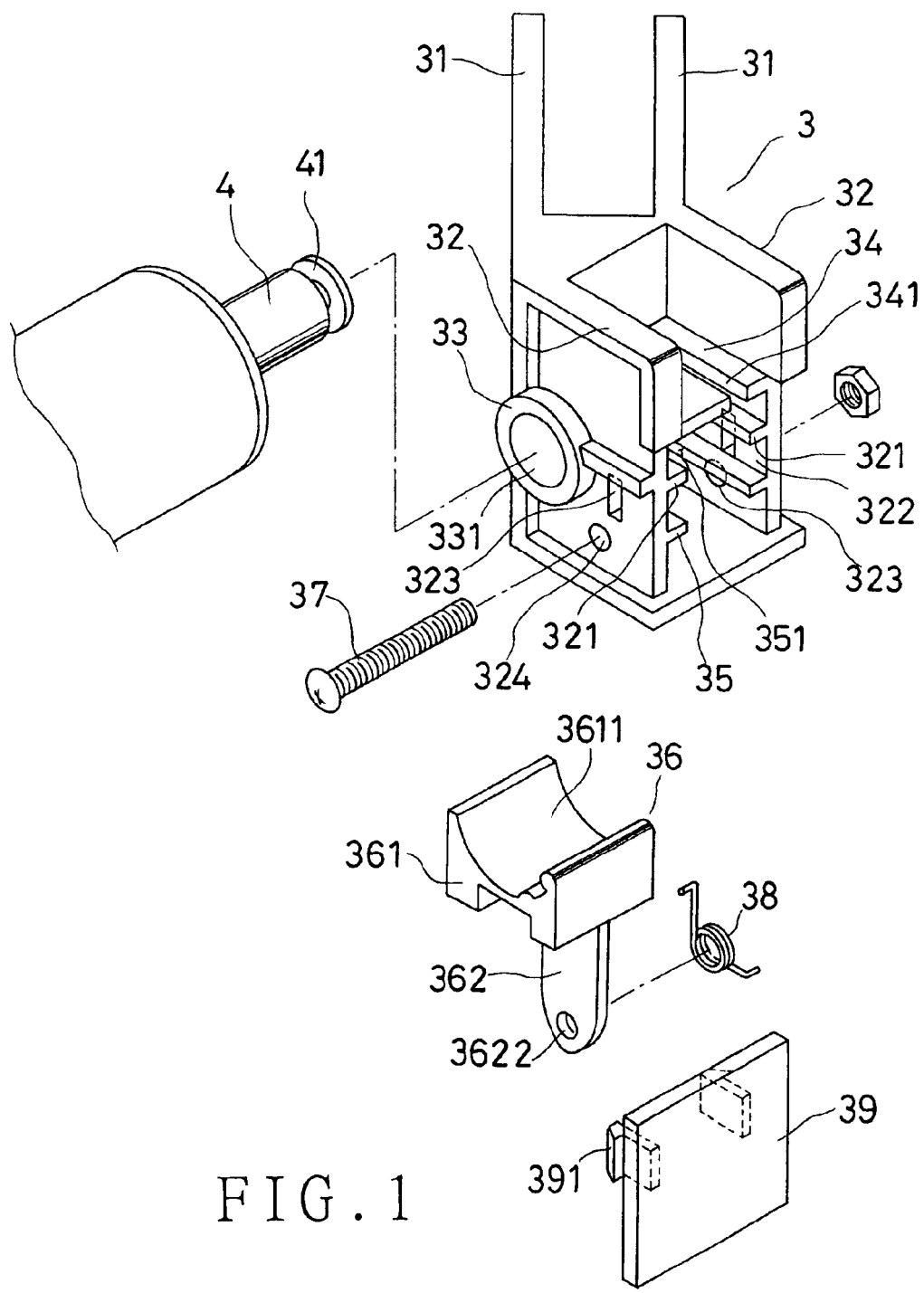
FIG. 1 is a partial exploded perspective view of the wheel of a golf cart according to the present invention.
Figure 2:
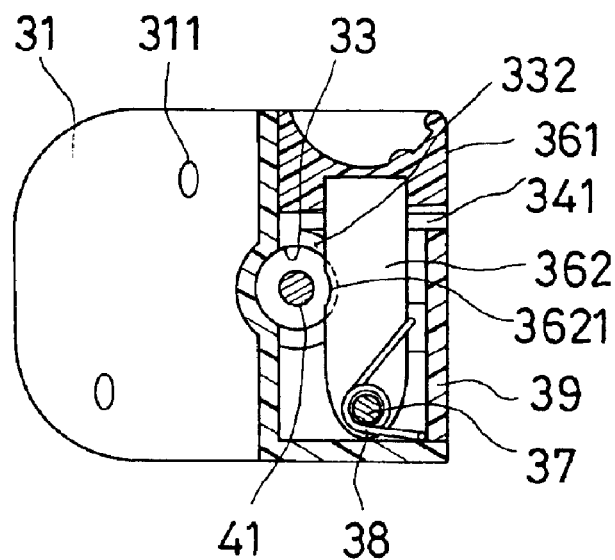
FIG. 2 is a side view of the connecting member and the axle of the wheel according to the present invention.
Figure 4:
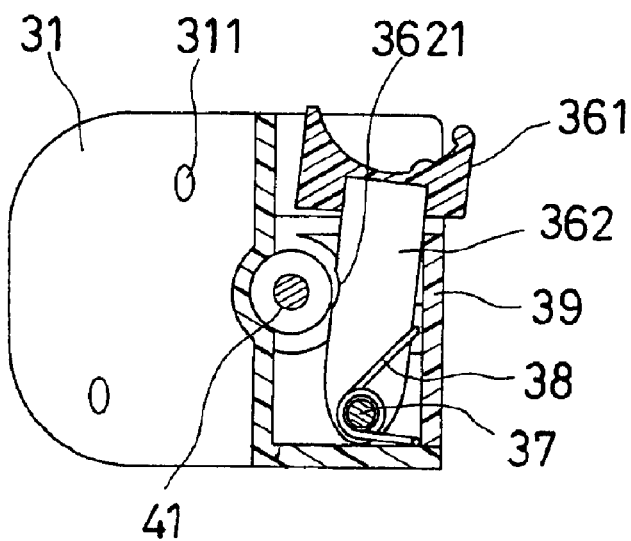
FIG. 4 is a side view of the connecting member and the axle of the wheel of the present invention, under operation for removal of the wheel.
Figure 3:
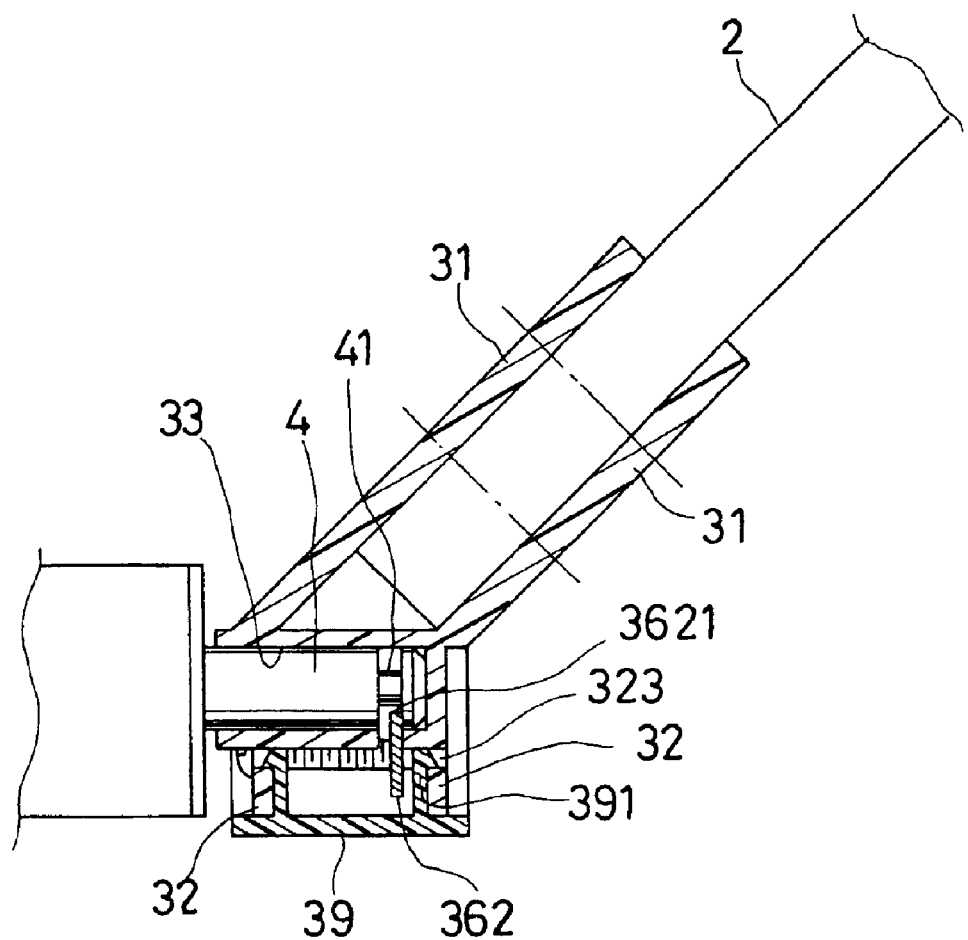
FIG. 3 is a partial cross-sectional view of the wheel according to the present invention.

Referring to FIGS. 1 to 3, a preferred embodiment of a wheel of a golf cart in the present invention includes a connecting member 3, an axle 4, and a rotary main body 5.

The connecting member 3 has two juxtaposed parallel lateral walls 31, two juxtaposed parallel lateral walls 32 extending from respective ones of the lateral walls 31, a tube portion 33 extending from an outer side of one of the lateral walls 32 to an inner side of the other lateral wall 32, a board part 34 extending between the lateral walls 32 and above the tube portion 33, and a board part 35 extending between the lateral walls 32 and above the tube portion 33. The tube portion 33 has an opening 331, and a gap 332 between the lateral walls 32. Each of the board parts 34, 35 has a gap 341, 351 opposing the gap 332 of the tube portion 33. Each of the lateral walls 32 has an elongated projection 321 above the board part 35 on the inner side; the board part 35 and the elongated projections 321 define guiding trenches 322 on both of the lateral walls 32. In addition, the lateral walls 32 have opposing pivotal holes 324 on lower portions near to lower ends thereof, and opposing hook holes 323 between the board part 35 and the elongated projections 321. The lateral walls 31 are formed with several pairs of opposing through holes 311. A cover 39 is provided for the connecting member 3; the cover 39 has hooks 391 on two lateral edges thereof, and is disposed next to edges of the lateral walls 32 to cover a space between the walls 32 with the hooks 391 being hooked on the hook holes 323 of the lateral walls 32.

The connecting member 3 is joined to a support 2 of a main frame of a golf cart with the support 2 being sandwiched between the lateral walls 31, and is secured in position by means of screwing screws 312 into the through holes 311 and the support 2.

An engaging element 36 is provided, which has an operated block 361, and an engaging plate 362 projecting from a lower side of the block 361. The operated block 361 is formed with a concavely curved upper side 3611. The engaging plate 362 is formed with a pivotal hole 3622 near to a lower end, and a concavely curved engaging section 3621 on an upper portion of an inward edge thereof. The engaging element 36 is pivoted to the connecting member 3 by means of passing a bolt 37 through the one of the pivotal holes 324 of the lateral walls 32, the pivotal hole 3622, and the other one of the pivotal holes 324 in sequence; the operated block 361 is positioned above the board part 34 while the engaging plate 362 is received in the gaps 341 and 351 of the board parts 34 and 35; a torsion spring 38 is positioned around the bolt 37 with two ends thereof being respectively hooked on an upper portion of an outward edge of the plate 362, and a bottom of the connecting member 3 such that the engaging plate 362 is normally biased to an engaging position by the torsion spring 38, in which engaging position the concavely curved engaging section 3621 is fitted in the gap 332 of the tube portion 33; the concavely curved engaging section 3621 of the plate 362 can be separated from the gap 332 by means of pushing the operated block 361 outwardly of the connecting member 3; the concavely curved upper side 3611 helps one move the operated block 361.

Figure 5:
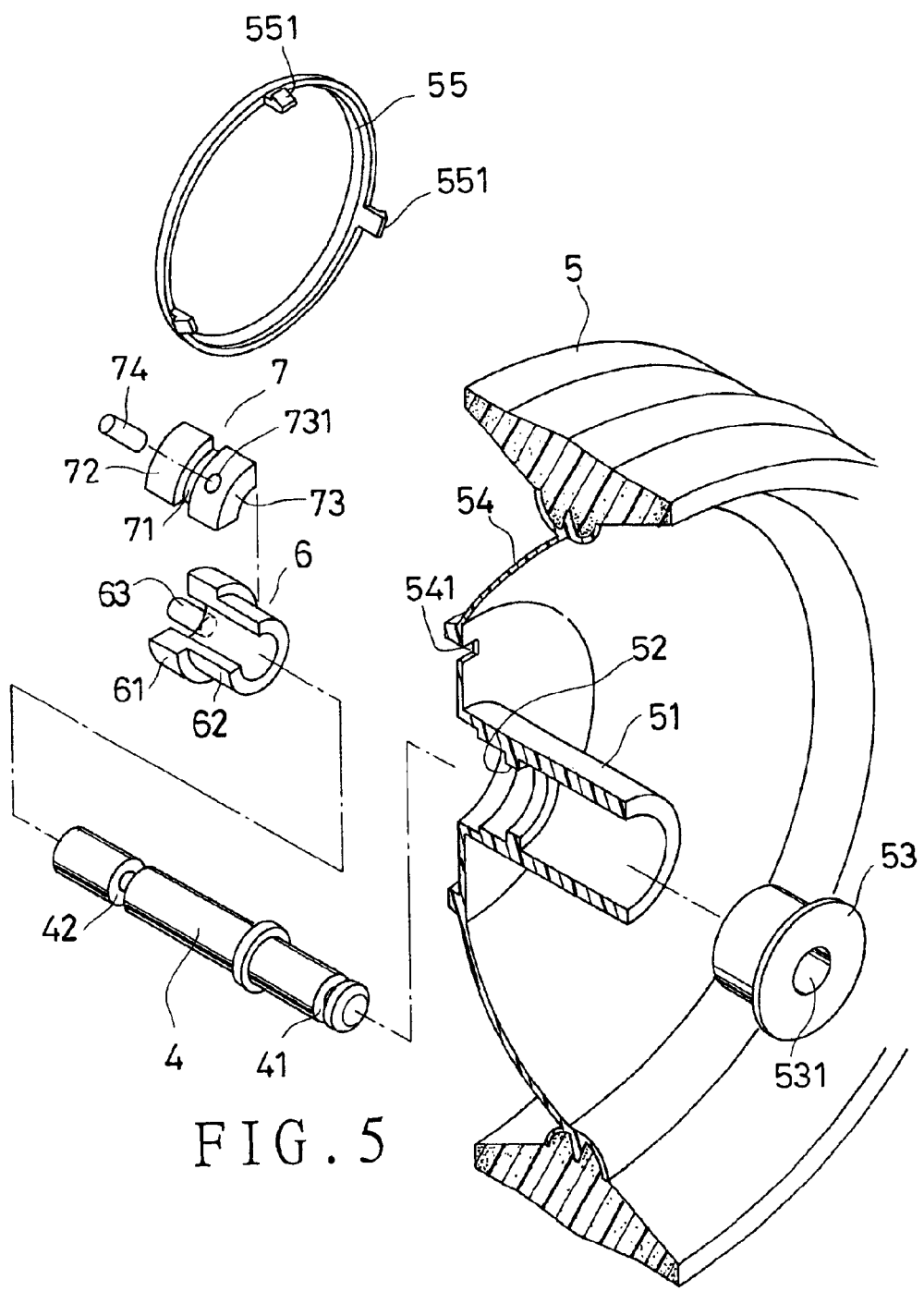
FIG. 5 is an exploded perspective view of the main body of the wheel of a golf cart according to the present invention.
Figure 6:
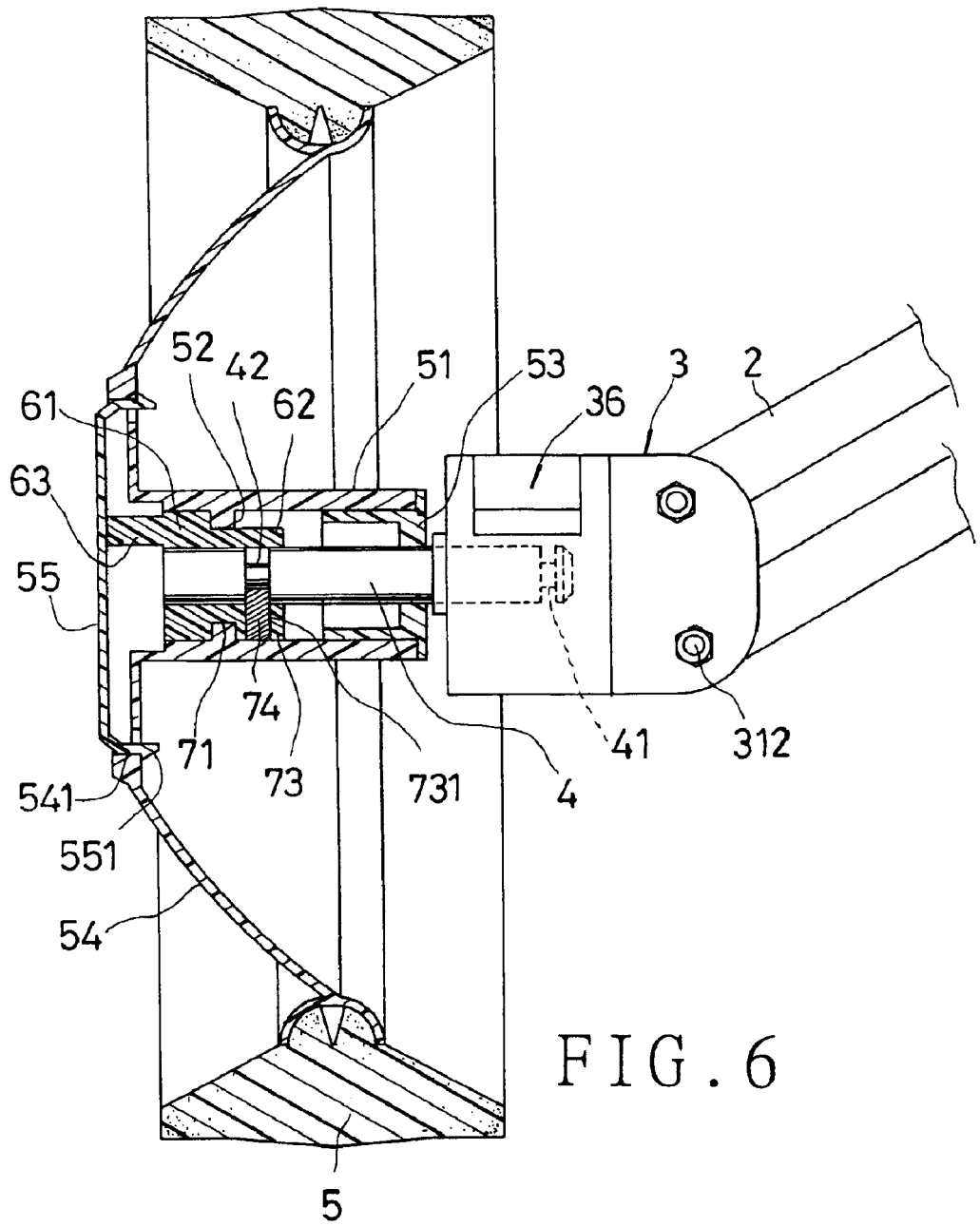
FIG. 6 is a partial cross-sectional view of the main body of the wheel of the present invention.
Figure 7:
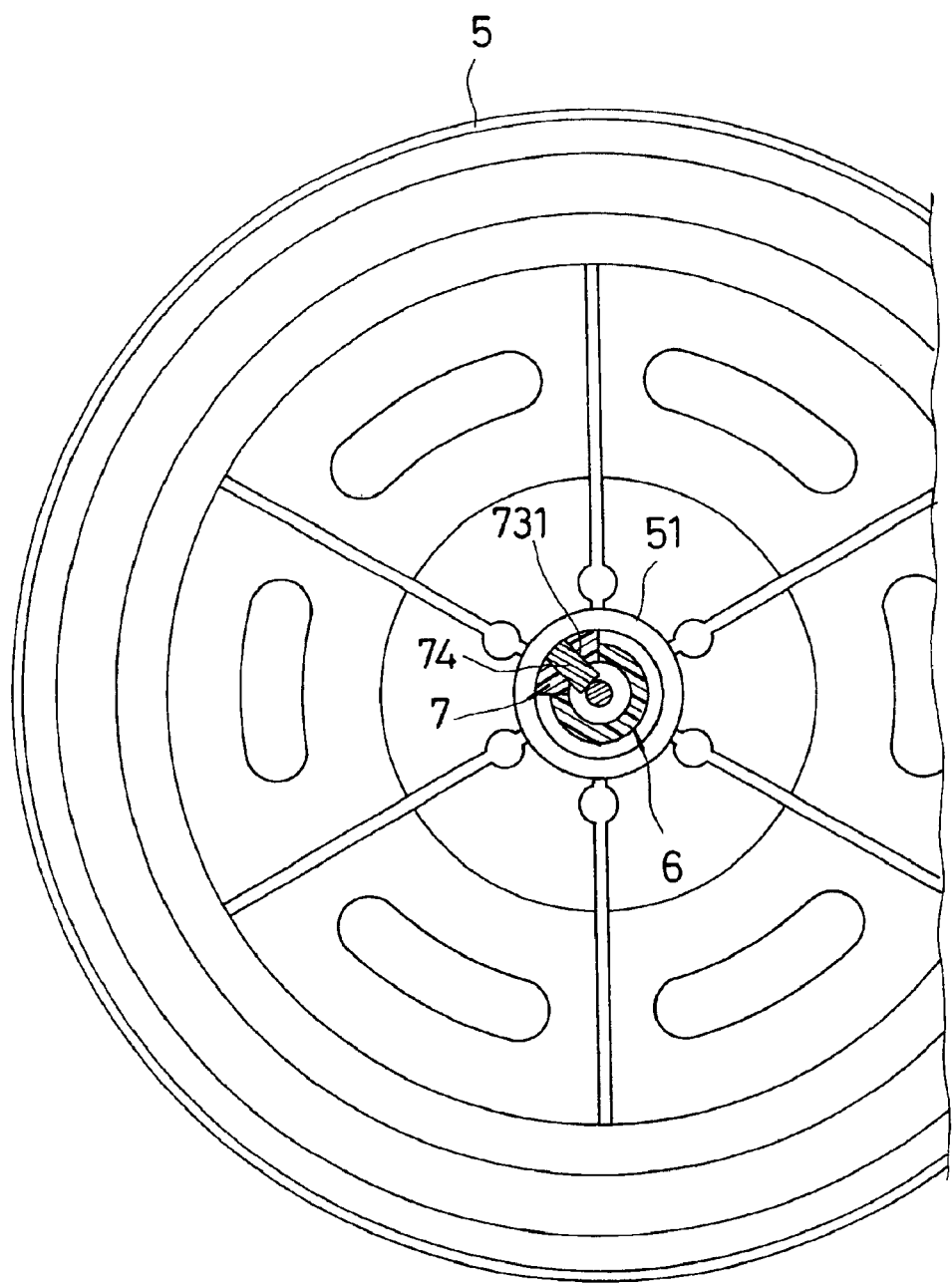
FIG. 7 is another partial cross-sectional view of the main body of the wheel of the present invention.
Figure 8:
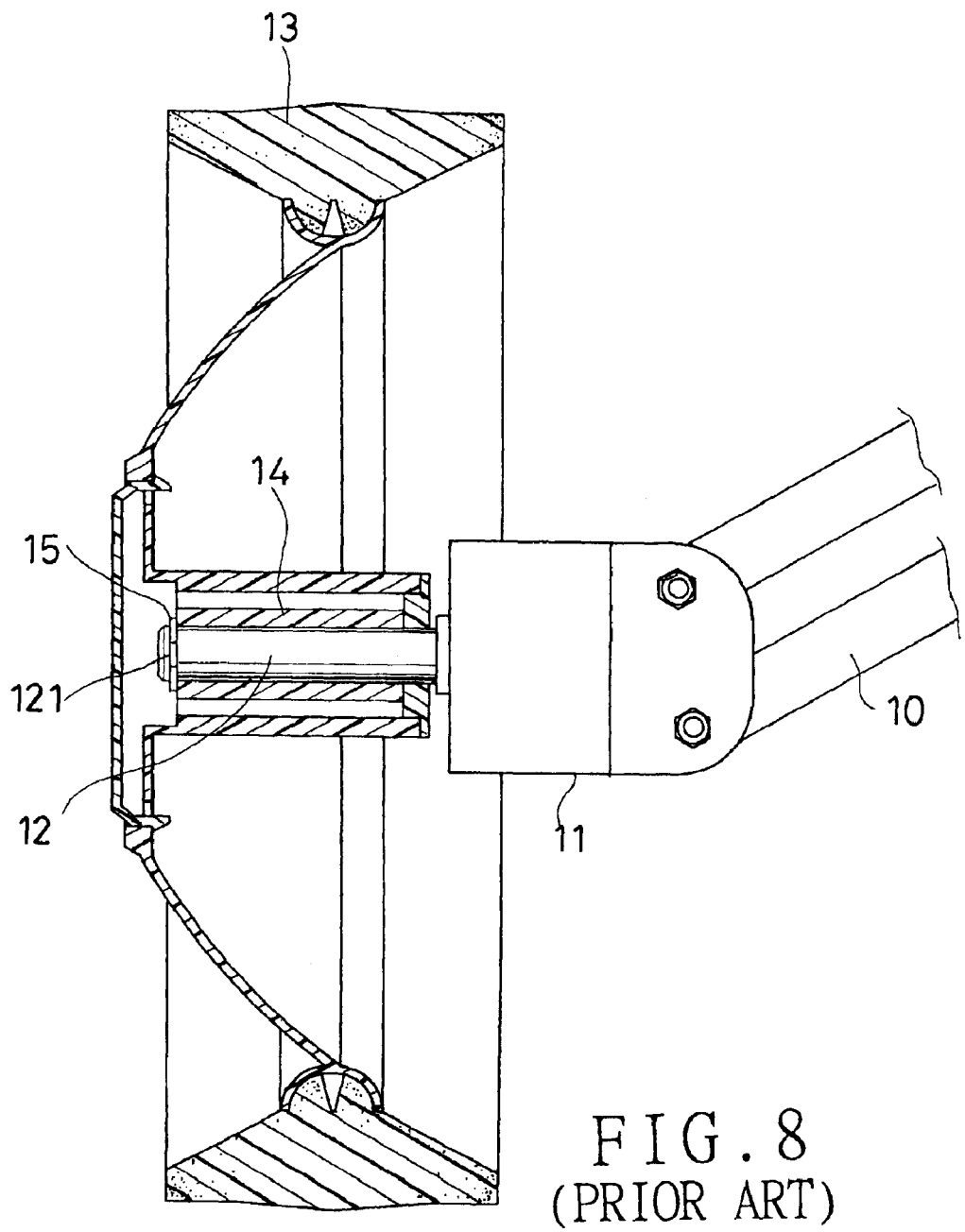
FIG. 8 is a front view of a conventional wheel of a golf cart.
Figure 9:
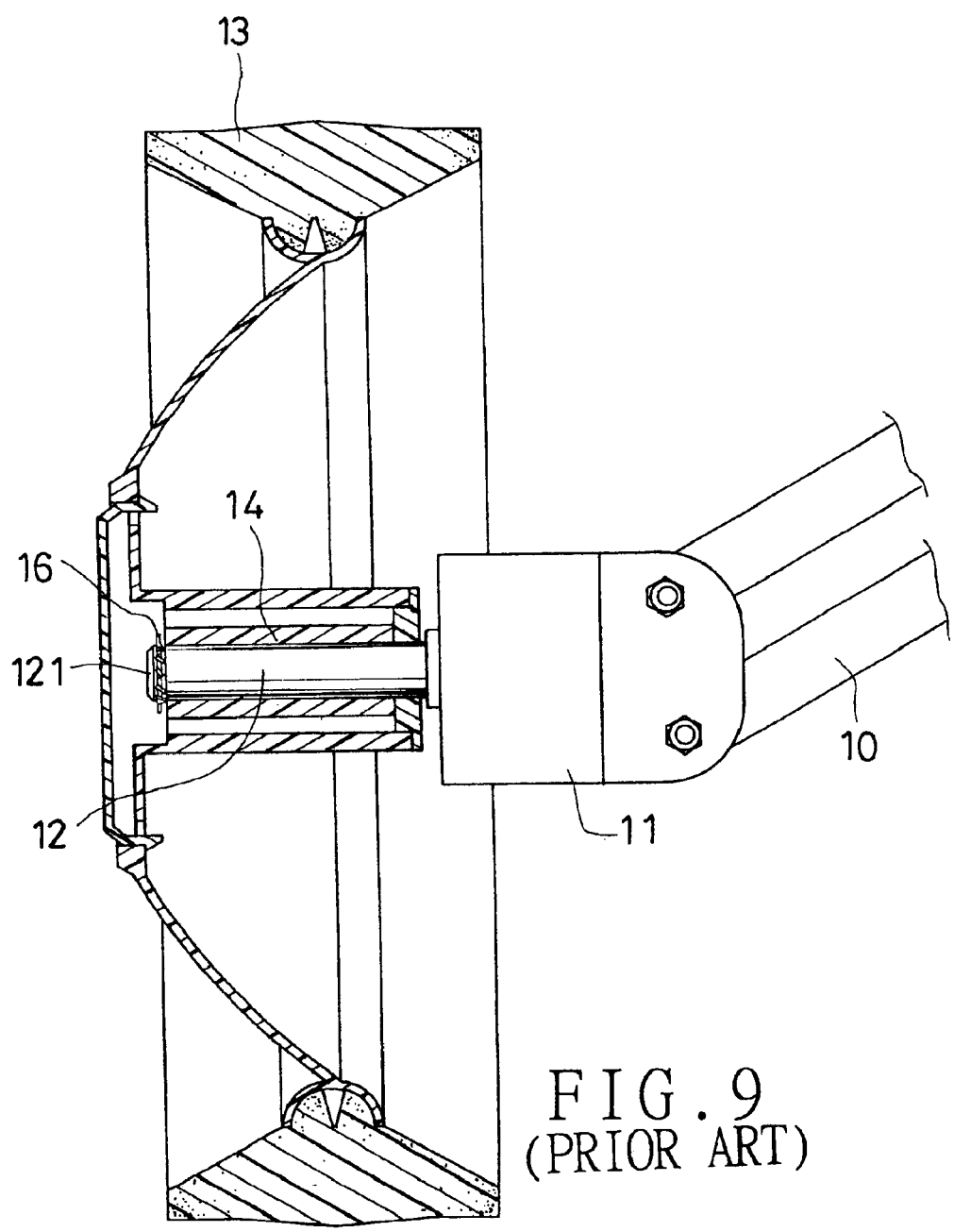
FIG. 9 is a front view of another conventional wheel of a golf cart.

The axle 4 is formed with an annular engaging recess 41 near to a first end, and an annular trench 42 near to the other end. In addition, the axle 4 is provided with a sleeve, which consists of a main part 6, and a subsidiary part 7, as shown in FIG. 5. The main part 6 of the sleeve has a left section 61, a right section 62, an abutting post 63 projecting from a tail end of the left section 61. The sleeve main part 6 is made such that the left section 61 is thicker than the right section 62, and the outward side of the left section 61 projects farther than the outward side of the right section 62; thus, a shoulder is formed at an intermediate portion. The subsidiary part 7 of the sleeve is separable from the main part 6, and can form a cylindrical hole together with the main part 6. The subsidiary part 7 has a left section 72, a right section 73, a trench 71 between the left and the right sections 72 and 73, a connecting hole 731 extending through the right section 73, and a rod 74 connected to the connecting hole 731 and projecting from an inward side of the subsidiary part 7.

The rotary main body 5 of the wheel has a disk portion 54, a tube portion 51 projecting from a middle of the disk portion 54, and a cap 53. The disk portion 54 has several through holes 541 spaced around the tube portion 51. The tube portion 51 is formed with an annular protrusion 52 on an inner side thereof. The cap 53 has an axial hole 531, which will be coaxial with the tube portion 51 when the cap 53 is coupled to a tail end of the tube portion 51. Furthermore, a cover 55 is provided, which has several hooks 551 on the edges, for covering the other end of the wheel main body 5.

To connect the axle 4 to the main body 5, the subsidiary part 7 is first positioned in the tube portion 51 with the trench 71 fitting over the annular protrusion 52, and then the axle 4 is inserted in the tube portion 51 with the rod 74 of the subsidiary part 7 being received in the annular trench 42, and with the first end of the axle 4 projecting from the tail end of the tube portion 51. Second, the main part 6 is inserted in the tube portion 51 from the smaller right section 62 with the shoulder (not numbered) thereof abutting the annular protrusion 52. Then, the cap 53 is passed around the axle 4, and joined to the tail end of the tube portion 51, and the cover 55 is joined to the disk portion 54 with the hooks 551 being passed through the through holes 541, and hooked on the disk portion 54; thus, the cover 55 prevents the sleeve parts 6 and 7 from falling off, contacting the abutting post 63 of the sleeve main part 6. To connect the wheel main body 5, coupled to the axle 4, to the connecting member 3, the engaging element 36 is first pivoted away from the normal engaging position, and then the first end of the axle 4 is inserted into the tube portion 33 until the annular engaging recess 41 opposes the gap 332 of the tube portion. And, the engaging element 36 is released such that it is biased back to the engaging position by the spring 38, and the concavely curved engaging section 3621 fits in the gap 332 as well as the recess 41 to detain the axle 4.

To remove the main body 5, the engaging element 36 is first pivoted such that the concavely curved engaging section 3621 disengages the axle 4 such that the main body 5 together with the axle 4 are removable front the connect member 3. And, to separate the axle 4 from the main body 5 for maintenance or replacement, first, the cover 55 is removed from the disk portion 54, and the sleeve main part 6 taken out of the tube portion 51, and the cap 53 removed for the axle 4 to become loose in the tube portion 51; thus, the axle 4 can be disengaged from the rod 74 of the sleeve part 7. Then, the axle 4, and the sleeve part 7 are taken out of the tube portion 51 in sequence.

From the above description, it can be easily understood that the present wheel of a golf cart has advantages as followings:

1. One can make the axle 4 disengaged from the engaging plate 362 easily by means of pushing the block 361. In other words, the main body 5 together with the axle 4 can be easily removed from the connecting member 3. Consequently, the golf cart can be further reduced in the dimension to occupy less space in packaging and transportation after it is folded.
2. The wheel is convenient to use because one only has to push the operated block 361 for allowing removal of the axle 4 from the connecting member 3, and for allowing connection of the axle 4 to the member 3.
3. The axle 4 can be separated from, and connected to the wheel main body 5 as many times as needed without damage being caused to it. Therefore, the axle 4 is relatively easy to maintain, and can be easily replaced with a new one when it is damaged.
4. One doesn't have to use a tool in separating the axle 4 from the wheel main body 5 or connecting the axle 4 to the main body 5 therefore the axle 4 is convenient to use.
5. There is no need for high precision axle 4 therefore axle 4 is easy and inexpensive to manufacture.

What is claimed is:

1. A wheel of a golf cart, comprising
   a connecting member coupled to a support part of a main frame of a golf cart; the connecting member having two juxtaposed parallel lateral walls; the connecting member having a tube portion extending from an outer side of one of the lateral walls to an inner side of other of the lateral walls; the tube portion having a gap between the lateral walls;
   an axle having an annular engaging recess near to a first end thereof; the axle being detachably inserted in the tube portion of the connecting member with the annular engaging recess opposing the gap of the tube portion;
   a rotary main body separably connected to the axle; and
   an engaging element for blocking movement of the axle away from the tube portion of the connecting member; the engaging element having an operated block, and an engaging plate projecting from the operated block; the engaging element being arranged between the lateral walls, and pivoted to the connecting member by means of a pivotal element supported on the lateral walls such that the engaging plate opposes the gap of the tube portion as well as the annular engaging recess of the axle; the engaging element being connected to a torsion spring; the torsion spring being positioned around the pivotal element, and hooked on an upper portion of an outward edge of the engaging plate, and a bottom of the connecting member at two ends thereof respectively, such that the engaging plate is normally biased towards, and fits in the gap of the tube portion as well as the annular engaging recess of the axle.

2. The wheel of a golf cart as claimed in claim 1, wherein the connecting member is formed with two board parts respectively above, and under the tube portion; each of the board parts having a gap opposing the gap of the tube portion for allowing the engaging plate of the engaging element to pass through to fit in the gap of the tube portion.

3. The wheel of a golf cart as claimed in claim 1, wherein the connecting member is provided with a cover, and the lateral walls have hook holes thereon; the cover having hooks projecting from edges thereof; the cover being disposed next to edges of the lateral walls to cover a space between the walls with the hooks being hooked on the hook holes.

4. The wheel of a golf cart as claimed in claim 3, wherein the lateral walls of the connecting member are formed with elongated projections, which define guiding trenches together with the board parts, and the hook holes are formed on the guiding trenches.

5. The wheel of a golf cart as claimed in claim 1, wherein the operated block of the engaging element has a concavely curved upper side.

6. The wheel of a golf cart as claimed in claim 1, wherein the rotary main body has a disk portion, a tube portion projecting from a middle of the disk portion, and a cap coupled to a tail end of the tube portion while the axle has an annular trench near to other end, and is provided with a sleeve;

the tube portion of the rotary main body having an annular protrusion on an inner side thereof; the cap having an axial hole;

the sleeve including a main part, and a subsidiary part separable from the main part and capable of forming a cylindrical hole together with the main part; the main part having a left section, and a right section; the left section being thicker than the right section; an outward side of the left section projecting farther than an outward side of the right section such that a shoulder is formed at an intermediate portion of the main part; the subsidiary part having a left section, a right section, and a trench between the left and the right sections thereof; the subsidiary part having a connecting hole extending through the right section thereof; the subsidiary part having a rod connected to the connecting hole and projecting from an inward side thereof;

the axle being passed through the tube portion of the rotary main body, with the first end projecting from the axial hole of the cap;

the sleeve main part and the subsidiary part being inserted in the tube portion of the rotary body from the right sections thereof with the trench of the subsidiary part being over the inner annular protrusion of the tube portion of the rotary body, and with an inward end of the rod of the subsidiary part being inserted in the annular trench, and with the shoulder of the main part abutting the inner annular protrusion for supporting the axle in between.

7. The wheel of a golf cart as claimed in claim 6, wherein the rotary main body is provided with a cover, and has a plurality of through holes on the disk portion around the tube portion thereof while the sleeve main part has an abutting post projecting from a tail end of the left section thereof; the cover having a plurality of hooks on an edge thereof; the cover being joined to the disk portion with the hooks being passed through the through holes, and hooked on the disk portion; the abutting post of the sleeve main part contacting the cover of the rotary main body after the cover is joined to the disk portion.

* * * * *